United States Patent

Strait et al.

[11] Patent Number: 5,868,982
[45] Date of Patent: Feb. 9, 1999

[54] SYSTEM FOR PREPARING GLASS FIBER PELLETS

[75] Inventors: Michael A. Strait, Johnstown; Homer G. Hill, Newark; Robert A. Schweizer, Granville; Stephen Seng, Howard, all of Ohio

[73] Assignee: Owens-Corning Fiberglas Technology, Inc., Summit, Ill.

[21] Appl. No.: 831,129

[22] Filed: Apr. 1, 1997

[51] Int. Cl.⁶ .............................. B29B 9/08; B29C 67/02
[52] U.S. Cl. .......................... 264/115; 264/117; 264/143
[58] Field of Search ............................ 264/115, 117, 264/140, 143

[56] References Cited

U.S. PATENT DOCUMENTS

| | | | |
|---|---|---|---|
| 4,840,775 | 6/1989 | Nakazawa et al. | 264/15 |
| 5,002,827 | 3/1991 | Shimada et al. | 428/407 |
| 5,578,535 | 11/1996 | Hill et al. | 501/35 |

Primary Examiner—Mary Lynn Theisen
Attorney, Agent, or Firm—C. Michael Gegenheimer; Inger H. Eckert

[57] ABSTRACT

A system for making densified glass fiber pellets from chopped segments of multi-filament glass strand is described. The densified pellets may be advantageously produced by hydrating chopped glass strands and then pelletizing them by tumbling in a rotary drum, and densifying the resulting pellets by tumbling in a rotating zig-zag or undulating tube for a period of time sufficient to increase their density but insufficient to degrade the fibers to a point where composite articles formed from such pellets have lower tensile or impact strengths than comparable composite articles formed from unpelletized strand segments.

20 Claims, 4 Drawing Sheets

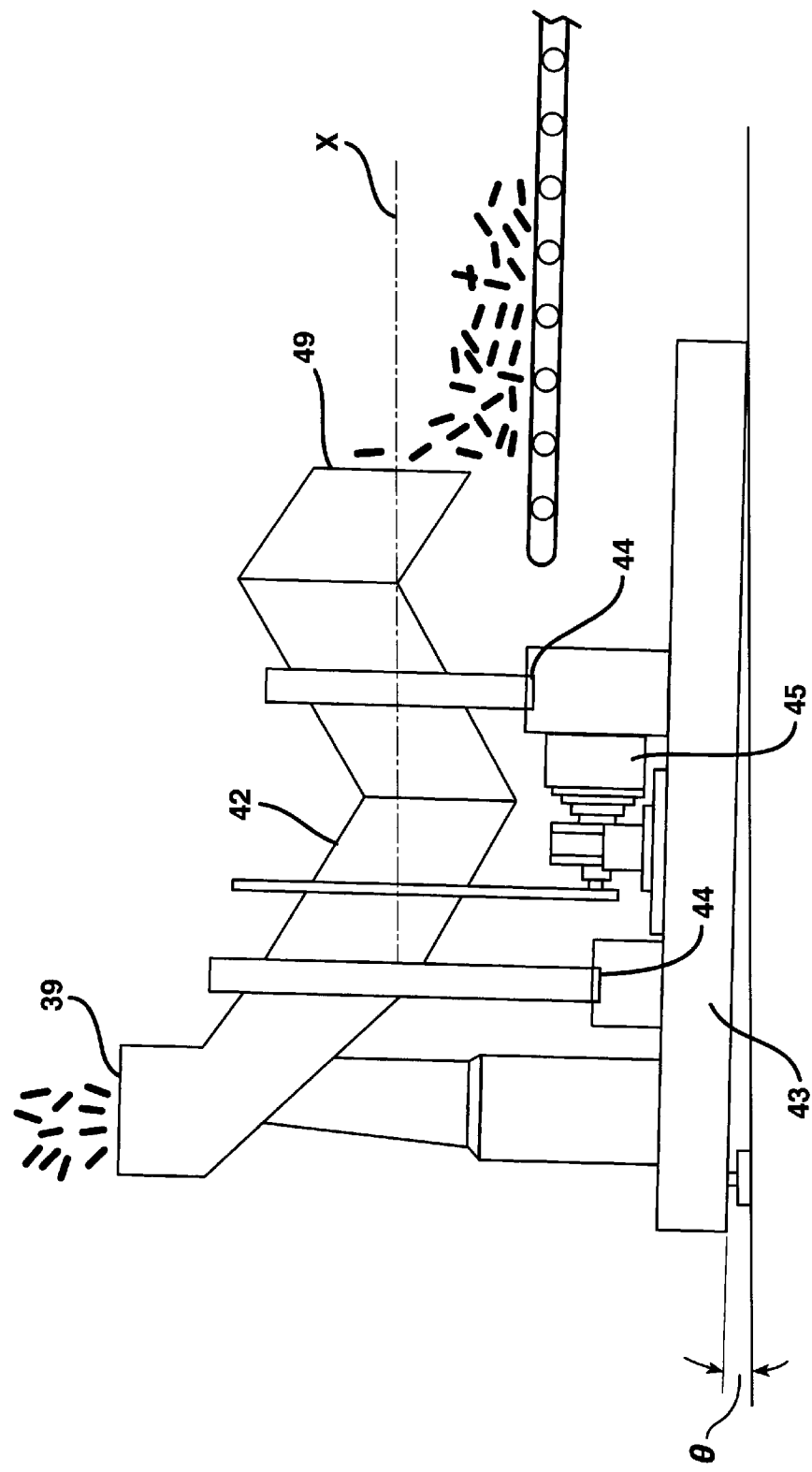

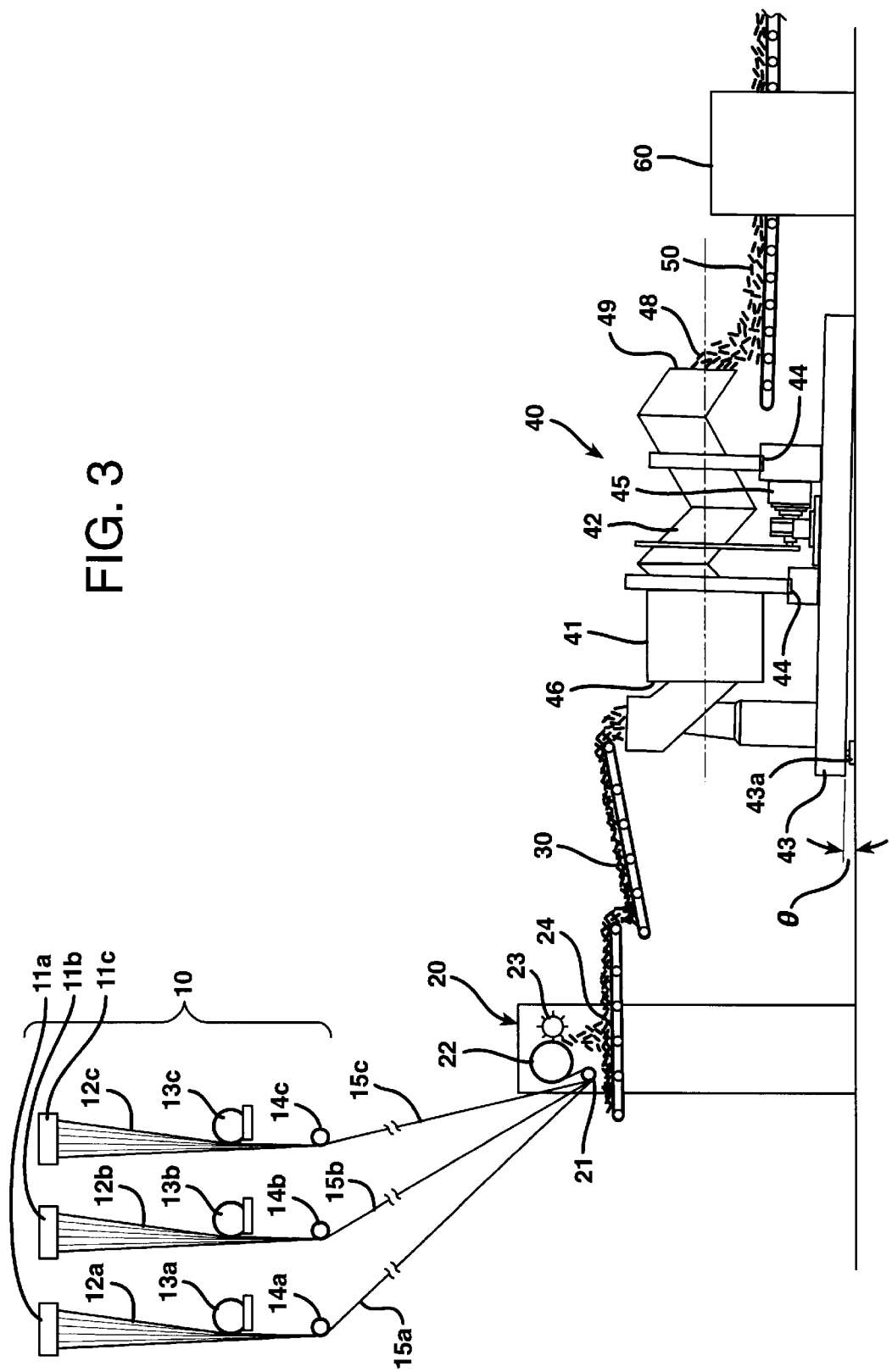

SYSTEM FOR PREPARING GLASS FIBER PELLETS

TECHNICAL FIELD AND INDUSTRIAL APPLICABILITY OF THE INVENTION

The present invention relates to the manufacture of glass fiber pellets. In particular, the present invention provides a process for making densified glass fiber pellets by combining multiple segments of a chopped multi-fiber glass strand. Such pellets provide a convenient form for the storage and handling of chopped glass fibers used as reinforcing materials in composite structures.

BACKGROUND OF THE INVENTION

Chopped glass fibers are commonly used as reinforcement materials in thermoplastic articles. Typically, such fibers are formed by drawing molten glass into filaments through a bushing or orifice plate, applying a sizing composition containing lubricants, coupling agents, and film-forming binder resins to the filaments, gathering the filaments into strands, chopping the fiber strands into segments of the desired length, and drying the sizing composition. These chopped strand segments are thereafter mixed with a polymerized resin, and the mixture supplied to a compression- or injection-molding machine to be formed into glass fiber reinforced plastic articles. Typically, the chopped strands are mixed with pellets of a thermoplastic polymer, and the mixture supplied to an extruder wherein the resin is melted, the integrity of the glass fiber strands is destroyed and the fibers are dispersed throughout the molten resin, and the fiber/resin dispersion is formed into pellets. These pellets are then fed to the molding machine and formed into molded articles having a substantially homogeneous dispersion of the glass fibers throughout.

Unfortunately, however, chopped glass fibers made via such processes are typically bulky and do not flow well. Consequently, such fibers are difficult to handle and have been problematic in automated processing equipment.

One attempt at solving this problem has been to compact the chopped strands into denser rod-shaped bundles or pellets to improve the flowability of the chopped strands and enable the use of automated equipment to weigh and transport the glass fibers for mixing with the thermoplastic resins. Such a process is disclosed in U.S. Pat. No. 4,840,755, wherein wet chopped strands are rolled, preferably on a vibrating carrier, to round the strands and compact them into denser, cylindrically shaped pellets. While such methods and apparatus tend to provide denser, more cylindrically shaped pellets exhibiting better flowability, they are undesirably limited in certain respects.

For example, the pellet size and fiber content are generally limited by the size and number of fibers in the chopped strand, in that the process is designed to avoid multiple chopped strand segments from adhering together to form pellets containing more fibers than are present in a single chopped strand. Consequently, to obtain pellets having a suitable bulk density and a sufficient ratio of diameter to length to exhibit good flowability, the strand from which the segments are chopped usually must be formed of a large number of filaments. However, increasing the number of filaments required to be formed and combined into a single strand undesirably complicates the forming operation.

In an attempt to overcome these shortcomings, U.S. Pat. No. 5,578,535 discloses glass fiber pellets that are from about 20 to 30 percent denser than the individual glass strands from which they are made, and from about 5 to 15 times larger in diameter. These pellets are prepared by hydrating cut strand segments to a level sufficient to prevent filamentization but insufficient to cause the strand segments to agglomerate into a clump, and mixing the hydrated strand segments for a time sufficient to form pellets. Suitable mixing includes a process that will keep the fibers moving over and around one another, such as tumbling, agitating, blending, commingling, stirring, or intermingling.

Although the disclosed pellets can be made by such diverse mixing processes, it has been discovered that many of such processes are either too inefficient to be used commercially, or cannot be adequately controlled to produce a uniform pellet product that provides the resulting composite article with strength characteristics comparable to those made from nonpelleted chopped strand fibers. For example, the use of a modified disk pelletizer frequently results in excessive residence time of the formed pellets within the mixer, which results in degradation of the pellets due to the abrasive nature of glass fiber pellets rubbing against one another. Such pellet degradation ultimately reduces the strength characteristics of the molded articles made therewith.

Accordingly, a need exists for an efficient pellet-forming process that controllably yields a uniform glass fiber pellet product that provides strength characteristics equal to nonpelleted chopped strand fibers in composite molded articles. Such a need is fulfilled by the present invention, which is summarized and described in detail below.

SUMMARY OF THE INVENTION

An object of the present invention is to provide an efficient pellet-forming process that controllably yields substantially uniform glass fiber pellets having a shape and a density that provide good flowability. Another object is to produce pellets that may be used in the manufacture of a glass fiber reinforced composite article without an appreciable loss in strength characteristics in comparison to comparable products made with nonpelleted chopped strands.

Such objects are achieved by a process wherein glass fiber strands comprised of a multiplicity of substantially continuous glass fibers are chopped into segments of the desired length and hydrated to a moisture content sufficient to cause the strand segments to coalesce into pellets upon tumbling. Thereafter, the strand segments are subjected to a first tumbling action to distribute the hydrating solution substantially uniformly over the strand segments and to cause the strand segments to combine to form pellets. The density of the pellets is then increased by compacting the pellets by a second tumbling action.

The process of the invention may advantageously employ an apparatus comprising: (a) means for cutting the glass fiber strands to form chopped strand segments; (b) means for conveying the chopped strand segments to a first tumbling apparatus; (c) means for applying a hydrating solution to the chopped strand segments; (d) a cylindrical tumbling apparatus for imparting a tumbling action to the chopped strand segments to disperse the hydrating solution and cause the chopped strand segments to align and coalesce into pellets; (e) means for conveying the pellets to a second tumbling apparatus; (f) a zig-zag or undulating tumbling apparatus for tumbling the pellets to compact them and increase their density; (g) means for conveying the densified pellets to a dryer; and (h) drying means adapted to receive and dry the pellets.

Other objects, features, and advantages of the invention will become apparent from the detailed description below in conjunction with the appended drawings, in which like reference numbers refer to like elements.

BRIEF DESCRIPTION OF THE DRAWINGS

FIG. 1b is a frontal view of a preferred embodiment of a pellet densifying system useful in the invention.

FIG. 3 is a diagram of a preferred apparatus of the invention for forming fibers and processing them into densified pellets.

DETAILED DESCRIPTION AND PREFERRED EMBODIMENTS OF THE INVENTION

Figure 1A:
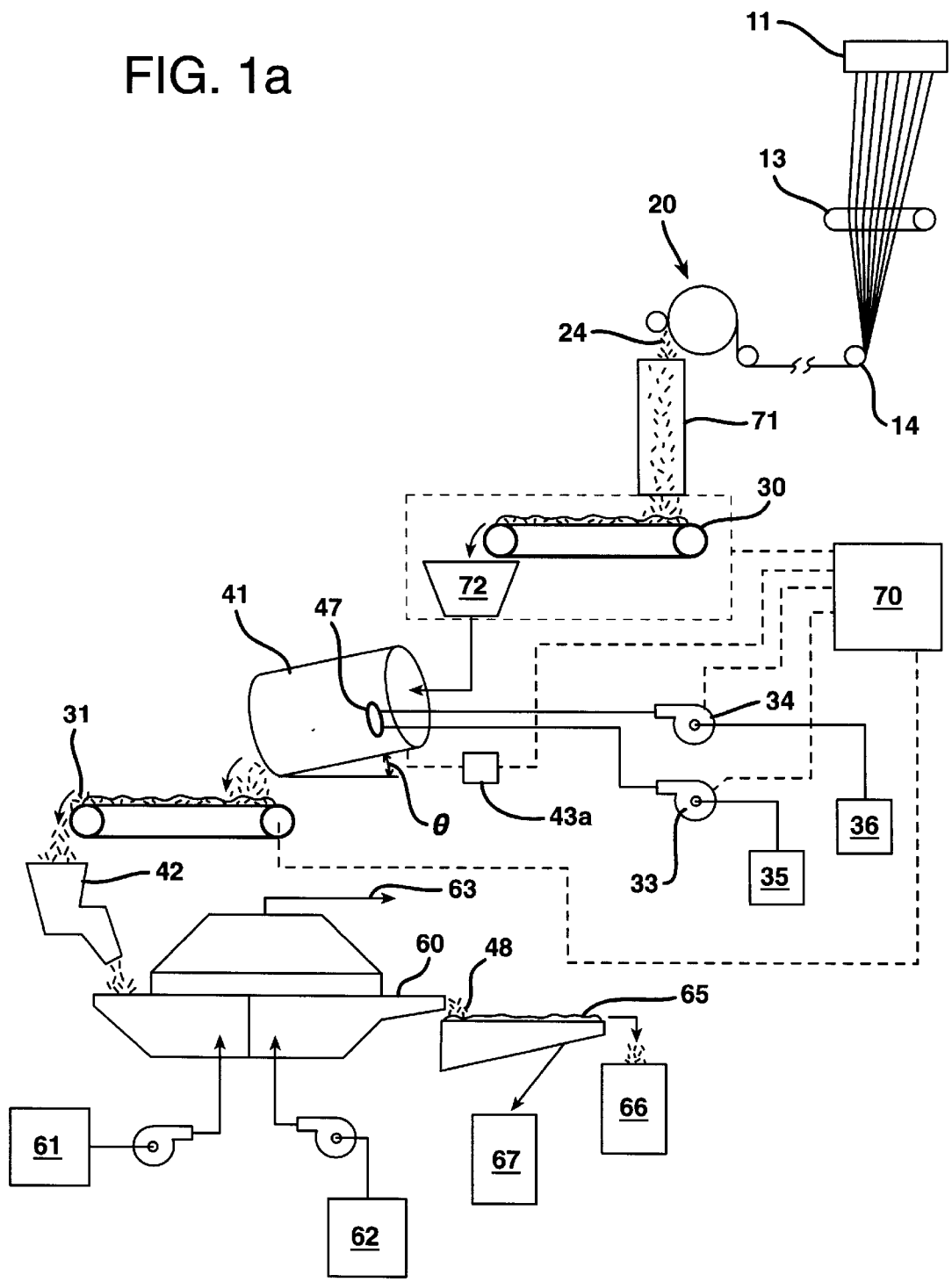
FIG. 1a is an illustration of a rotary drum pelletizing system useful in the invention.
Figure 2:
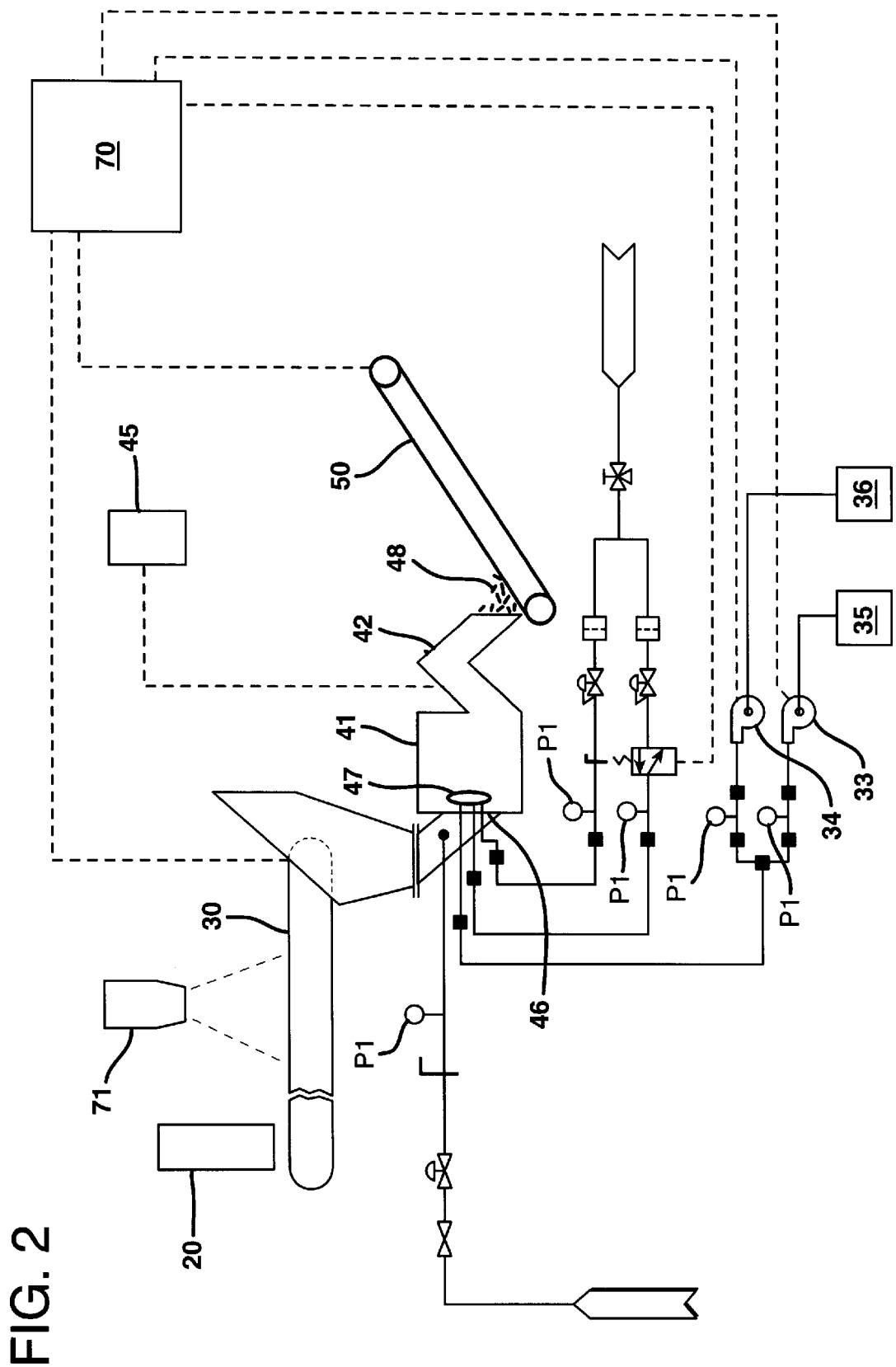
FIG. 2 is a frontal view of a preferred embodiment of a blender apparatus for performing pelletizing and densifying steps.

In the process of the invention, a strand of substantially continuous glass fibers is formed by conventional techniques such as drawing molten glass through a heated bushing to form a multitude of substantially continuous glass fibers and collecting the fibers into a strand. Any suitable apparatus for producing such fibers and collecting them into a strand can be used in the present invention.

Suitable fibers are fibers having a diameter of from about 3 microns to about 90 microns, and suitable strands contain from about 50 fibers to about 2000 fibers. Preferably, the strands formed in the process of the invention contain from about 400 fibers to about 800 fibers having a diameter of from about 3 microns to about 23 microns.

After the fibers are formed, and prior to their collection into a strand, the fibers may be coated with a suitable aqueous sizing composition, such as one known in the art. Preferably, the sizing composition consists essentially of water, one or more coupling agents, and optionally, one or more lubricants and pH adjusters.

Suitable coupling agents include organofunctional silanes, such as those available from Witco under the following trade designations:

| A-154 | Methyl-trichloro-silane | $MeSiCl_3$ |
| A-163 | Methyl-trimethoxy-silane | $MeSi(OCH_3)_3$ |
| A-189 | γ-Mercaptopropyl-trimethoxy-silane | $HS(CH_2)_3Si(OCH_3)_3$ |
| A-143 | γ-Chloropropyl-trimethoxy-silane | $Cl(CH_2)_3Si(OMe)_3$ |
| A-151 | Vinyl-triethoxy-silane | $CH_2=CHSi(OC_2H_5)_3$ |
| A-172 | Vinyl-tris-(2-methoxyethoxy)silane | $CH_2=CHSi(OCH_2CH_2OCH_3)_3$ |
| A-188 | Vinyl-triacetoxy-silane | $CH_2=CHSi(OOCCH_3)_3$ |
| A-1100 | γ-(Amino)-propyl-triethoxy-silane | $H_2N(CH_2)_3Si(OC_2H_5)_3$ |
| A-1120 | n-(Trimethoxy-silyl-propyl-ethylene-diamine) | $H_2N(CH_2)_2NH(CH_2)_3Si(OCH_3)_3$ |
| A-174 | γ-(Methacryloxy)propyl-triethoxy-silane | $\underset{CH_2=C-CO(CH_2)_3Si(OCH_3)_3}{\overset{CH_3\quad O}{\phantom{x}}}$ |
| A-187 | γ-Glycidoxy-propyl-trimethoxy-silane | $CH_2\underset{O}{-}CH-CH_2O(CH_2)_3Si(OCH_3)_3$ |

Preferred coupling agents for use in the invention are 3-aminopropyltriethoxy-silane and gamma-glycidoxypropyltrimethoxy-silane commercially available from Osi of Witco under the trade, designations A-1100 and A-187, respectively. Preferably, the organofunctional silanes are used in an amount of from about 0.1 percent to about 1.0 percent of the sizing composition.

Any suitable lubricant may be used in the sizing composition, such as water-soluble ethyleneglycol stearates, ethyleneglycol oleates, ethoxylated fatty amines, glycerine, emulsified mineral oil, and organo polysiloxane emulsions. Preferred lubricants include: polyethyleneglycol monostearate; polyethyleneglycol mono-oleate; butoxyethyl stearate: stearic ethanolamide (Lubsize K12, available from Alpha/Owens Corning); a lubricant disclosed in U.S. Pat. No. 3,597,265, the disclosure of which is incorporated by reference herein (available from Emery Corp. under the trade designation Emerlube 6760); and a blend of 30% white oil, 30% polyethylene glycol 400 monopelargonate, 30% polyoxyethylene (3) myristic alcohol, and 10% ethoxylated alkyl amine (Parastat S-2) (Emerlube 7607, available from Emery Corp.). Preferably, the lubricant is present in the sizing composition in an amount of from about 0.05 percent to about 0.10 percent by weight.

Additionally, small amounts of weak acids, such as acetic acid, may be added to the sizing composition to lower the pH of the composition to from about 3.5 to about 8. Preferably, such acids are present in the composition in an amount of from about 0.15 percent to about 0.3 percent by weight, and the pH of the composition is from about 6 to about 8.

Suitable sizing compositions for the invention include:

| | | |
|---|---|---|
| 1. | A-1100 organofunctional silane (58% active content) | 0.5% |
| | Deionized water | Balance |
| 2. | A-1100 organofunctional silane (58% active content) | 0.5% |
| | Lubesize K12 (Alpha/Owens Corning) | 0.07% |
| | Glacial acetic acid | to pH of 6 to 8 |
| | Deionized water | Balance |
| 3. | A-1100 organofunctional silane (58% active content) | 0.5% |
| | Emerlube 7607 (Emery Corp.) | 0.1% |
| | Deionized water | Balance |
| 4. | A-1100 organofunctional silane (58% active content) | 0.5% |
| | Polyethylene glycol 400 monostearate | 0.1% |
| | Deionized water | Balance |
| 5. | A-1100 organofunctional silane (58% active content) | 0.5% |
| | Emerlube 6760U (Emery Corp.) | 0.01% |
| | Deionized water | Balance |
| 6. | A-1100 organofunctional silane (58% active content) | 0.38% |
| | A-187 organofunctional silane | 0.12% |
| | Deionized water | Balance |

The aqueous sizing composition can be applied by any conventional means, including a kiss roll applicator and sprays. Preferably, the sizing composition is applied by passing the fibers over a kiss roll applicator. Moreover, the sizing is preferably applied to the fibers in an amount sufficient to provide the fibers with a moisture content of from about 8 percent to about 13 percent, more preferably about 11% (unless indicated otherwise, all percentages herein are by weight).

Once formed, the continuous strands are chopped into lengths of from about one-eighth inch to one and one-fourth inch. Any suitable means known in the art for chopping glass fiber strands into such lengths can be used in the process.

Thereafter, the moisture content of the chopped strand segments is adjusted to a level suitable for the formation of pellets when the chopped stand segments are caused to move over and around one another, and the chopped strand segments are introduced into a pelletizer, which imparts such motion to the strand segments. While the moisture content of the strand segments can be adjusted prior to their introduction into the pelletizer, it is preferred that the glass fibers are hydrated to a moisture content suitable for pellet formation in the pelletizer. Preferably, the moisture content of the fibers in the pelletizer is from about 12 percent to about 16 percent, more preferably from about 13 percent to about 14 percent. If the moisture content is too low, the strands tend not to combine into pellets and will remain in a typical strand formation. Conversely, if the moisture content is too high, the strands tend to agglomerate or clump or form pellets of too large a diameter and an irregular, noncylindrical shape.

Additionally, it is preferred that the hydrating fluid also contain a binder or second sizing composition. The hydrating fluid may thus contain suitable components, such as those typically included in glass fiber sizing compositions, e.g., film formers, wetting agents, anti-static agents, and additional coupling agents and lubricants. By applying this second sizing composition in the pelletizer, an application efficiency of 100% may be attained. Moreover, applying this sizing outside of the fiber-forming environment permits the inclusion of materials which are not desirable in the forming process because of toxicity, cleanliness, odor, high cost, or shear sensitivity.

Examples of suitable binder compositions that can be incorporated into the hydrating fluid include the following compositions (unless indicated otherwise, all percentage are by weight):

the chopped strands are completely coated with the sizing composition, which results in pellets formed of fibers that are not all coated with the sizing composition. When such pellets are used in the manufacture of fiber reinforced plastic articles, the uncoated fibers lack the interfacial coating required to provide good reinforcing characteristics, and the resulting article will have less than optimal properties. Preferably, the pelletizer is equipped with a spray nozzle located adjacent to the strand segment inlet for spraying the sizing composition onto the strand segments as they enter the pelletizer.

The pelletizer used in the present invention can be any apparatus capable of tumbling the strand segments in such a way that: (1) they become substantially uniformly coated with the aqueous binder/sizing composition; and (2) multiple chopped strand segments align and coalesce into pellets of the desired size. Such a tumbling apparatus should have an average residence time sufficient to insure that the strand segments become substantially coated with the hydrating fluid and form pellets, but insufficient for the pellets to be damaged or degraded through abrasion by rubbing against one another. Preferably, the residence time in the tumbling apparatus is from about 1 minute to about 10 minutes. More preferably, the residence time in the tumbling apparatus is from about 1 minute to about 3 minutes.

A preferred pelletizer is a rotating drum, such as drum 41 shown in FIG. 1a. The pelletizer 41 receives chopped strand segments 24, which may be prepared using a fiber-forming bushing 11, size applicator 13, gathering shoe 14, and chopping device 20.

In a preferred embodiment, the apparatus is provided with a system for monitoring and/or adjusting various

| | |
|---|---|
| 1. EpiRez 3544 - epoxy water dispersion at 53% resin solids (Shell Chem. Co). | 12.58% |
| Witco 290H - polyurethane water dispersion at 62% resin solids (Witco Co.) | 0.99% |
| A-1100 organofunctional silane at 58% active solids (Witco Co.) | 0.10% |
| Deionized water | Remainder |
| 2. Size compositions described in U.S. Pat. No. 5,236,982, the disclosure of which is incorporated by reference herein. | |
| 3. Terephthalic acid | 3.21% |
| Ammonium hydroxide at 28% active content | 3.89% |
| GenFlo 559 - polyurethane water dispersion at 50% resin solids (General Tire and Rubber Co.) | 4.06% |
| ChemCor 43N40 polypropylene water dispersion at 40% resin solids (Chemical Corporation of America) | 8.12% |
| Deionized water | Remainder |
| 4. Z6020 - organofunctional silane (Dow Corning Corp.) | 2.65% |
| Pluronic 10R5 - block copolymer of ethylene oxide and propylene oxide (BASF Corp.) | 1.8% |
| Deionized water | Remainder |
| 5. Z6020 | .89% |
| Maldene 286 - copolymer of maleic anhydride and butadiene (Lindau Chemicals, Inc.) | 13.3% |
| Ammonium hydroxide at 28% active content | 1.6% |
| Deionized water | Remainder |

The foregoing are examples of binder formulations which have been evaluated and been found useful in the process of the invention. The artisan may select other suitable binders formulations or other components that may be used. Indeed, an advantage of the invention is that almost all aqueous size formulations used in glass fiber forming technology should be useful as binders for spraying onto the fibers in the tumbling apparatus in accordance with the process of the invention.

To ensure good coverage of the fiber strands, it is preferred that the sizing be applied to the strand segments as they enter the pelletizer and before they begin to coalesce into pellets. If the sizing is applied at other locations within the pelletizer, there is a tendency for pellets to form before parameters, which may be automatically controlled via a control panel 70, such as an Allen Bradley PLC-5/40 PLC system. If desired, the moisture content of the incoming strand segments 24 may be measured using suitable means 71. A strand weighing device 72 may be provided and suitably located, e.g., before, after, or in association with strand conveyor 30. A similar weighing device may be used to monitor the weight of the pellets on conveyor 31. Metering of binder and water may be achieved by controlling pumps 33 and 34.

The drum 41 is adapted to accommodate a spray head for applying the hydrating solution to the strand segments 24 as they enter the drum. Preferably, an external air-mixing nozzle 47 is mounted in the drum near its inlet for mixing of an aqueous binder composition, which may be supplied via a Masterflex pump 33 from a binder supply 35, with any additional water, which may be supplied via a Masterflex pump 34 from a water supply 36, required to bring the moisture content of the chopped strand segments to the desired level and apply the mixture to the chopped strand segments in the drum. The binder composition and water are combined into one fluid stream through the nozzle orifice, which is then hit with two jets of air positioned 180 degrees apart and at an angle of 60 degrees to the direction of the stream flow. This effectively creates a mist which is propelled onto the surface of the tumbling strand segments in the drum. Rotation of the drum causes the wet strand segments to tumble around one another while the surface tension created by the wet sizing or coating causes strand segments contacting one another over a substantial portion of their length to align with one another and coalesce into a cylindrically shaped pellet. By such action, any fines or single fibers created during the chopping operation are recombined with and incorporated into the forming pellets to essentially eliminate individual fine fibers from the resulting pellets. Preferably, the drum is tilted slightly so that the end of the drum from which the pellets exit is lower than the end in which they enter to ensure that the pellets formed in the drum do not remain in the drum for an excessive period of time. In a preferred embodiment, the drum is tilted such that its axis of rotation is at an angle ($\theta$) of from about 1 degree to about 3 degrees from horizontal. The angle of tilt may be adjusted manually or automatically using appropriate adjustment means 43a.

The size of the pellets formed in the drum is controlled primarily by the moisture content of the strand segments. If the moisture content is maintained at a high level, a greater number of strand segments will coalesce into a pellet and the pellet will thus be of larger diameter. Conversely, if the moisture is maintained at a lower level, fewer strand segments will coalesce into a pellet and the pellet will thus have a smaller diameter.

Preferably the pellets formed by the process of the invention have a diameter of from about 20% to about 65% of their length. Such pellets are typically formed by combining from about 70 strand segments to about 175 strand segments, each containing from about 500 individual filaments per strand to 2000 individual filaments per strand.

The size of the pellets is also effected by the drum throughput. If the drum throughput is high, the strand segments have a shorter residence time in the drum, which tends to result in the formation of smaller pellets because the fluid application does not disperse on the strands and the strands will not coalesce into a pellet. However, because the pellets that are formed are in the drum for a shorter period of time, less compaction of the pellets occurs.

Although some compaction of the formed pellets invariably occurs in the pelletizer, it is typically insufficient to increase the pellet density to a level providing optimum flowability. For this reason, after their formation in the pelletizer 41, the pellets are fed into a densifier 42 wherein the pellets are further compacted and densified. Any low-impact tumbling apparatus that will compact the pellets without degrading them through abrasion or otherwise damaging the pellets can be used. Preferably, the densifier has a gentler, less vigorous tumbling action than that of the pelletizer to minimize such degradation of the pellets. Furthermore, the densifier preferably has an average residence time of less than about 5 minutes, to ensure that the pellets are not degraded through abrasion. More preferably, the average residence time in the densifier is from about 1 minute to about 2 minutes.

A preferred densifier is a zig-zag tube adapted to be rotated about its longitudinal axis (x) as shown in FIG. 1b. The zig-zag tube 42 is rotationally mounted on a frame 43 via caster assemblies 44 and rotationally driven by drive motor 45. As the tube is rotated, pellets in the tube are gently tumbled about by the tube's rotation as they are pulled through the tube by gravity. As with the rotating drum above, the zig-zag tube densifier is preferably tilted at a slight angle to ensure that the pellets flow through the apparatus without excessive residence times. Preferably the longitudinal axis of the tube is at an angle of from about 1 degree to about 3 degrees from horizontal, with the tube inlet 39 being higher than the tube outlet 49.

Although pellet formation and densification may occur in separate apparatuses, such as a separate rotary drum 41 and a rotating zig-zag tube 42 with a conveyor 31 therebetween as shown in FIG. 1a, the process of the present invention may be accomplished using other suitable means. For example, pellet formation and densification may occur in different apparatuses or in separate tumbling regions or zones within a single apparatus. A preferred example of such an apparatus is a "Zig-Zag" blender commercially available from Patterson Kelly, which is illustrated at 40 in FIG. 3.

Blender 40 comprises a rotating drum 41 connected to a zig-zag tube 42 at one end of the drum. Both the drum 41 and tube 42 are rotationally mounted on a frame 43 via caster assemblies 44 and rotationally driven by a variable-speed motor 45. The zig-zag tube is attached to the drum at a location radially distant form the rotational center of the drum and is in flow communication therewith such that upon each revolution of the drum, material inside the drum will flow into the tube as the tube attachment site goes below the level of material in the drum. The chopped strand segments 24 enter pelletizing drum 41 through inlet 46. The incoming strand segments are sprayed with a hydrating solution, preferably containing binders, film formers, lubricants, antistats, and coupling agents, through spray nozzle 47 located adjacent inlet 46. The rotation of pelletizing drum 41 causes the strand segments inside the drum to tumble over and around one another, which distributes the hydrating solution over the surface of the strand segments and causes the strand segments to align and coalesce into pellets 48, which may be delivered onto a conveyor belt 50. In this embodiment, pellets formed in the drum are further densified in the zig-zag tube.

After densification, the pellets are dried, e.g., using a hooded oven supplied with hot air 61 and cooling air 62 or any suitable drying means 60. In order to reduce drying time to a level acceptable for commercial mass production, it is preferred that the fibers are dried at elevated temperatures of from about 250° F. to about 560° F. in a fluidized-bed oven. After drying, the densified pellets 48 may be classified by size using a screen 65 or other suitable device.

By varying the throughput and moisture content of the glass strand segments, glass fiber pellets can be made that are from about 13% to about 60% denser than the corresponding unpelleted glass strand segments, and from about 10 times to about 65 times larger in diameter. For example, chopped 4-mm (length) segments of a 2000-filament strand composed of 14-micron (diameter) fibers typically have a bulk density of from about 33 lb./ft$^3$ to about 36 lb./ft$^3$. After being hydrated to a moisture content of from about 13 percent to about 14 percent and formed into densified pellets according to the process of the invention, the resulting dried pellets typically have a bulk density of from about 40 lb./ft$^3$ to about 55 lb./ft$^3$. As a result of their increased diameter-to-length ratio and increased density, the resulting pellets exhibit significantly improved flowability in comparison to the unpelleted chopped strand product.

The process of the invention is preferably carried out with an apparatus as depicted in FIG. 3, wherein fiber strands are formed in fiber-forming apparatus 10, chopped using cutting device 20, and transported by conveyor 30 to tumbling apparatus 40 where the chopped strands are pelletized and densified. The resulting pellets are transported by conveyor 50 to drying device 60.

The fiber-forming apparatus 10 preferably includes a glass fiber-forming furnace having fiber-forming bushings 11a, 11b, and 11c from which a multiplicity of filaments 12a, 12b, and 12c are drawn or attenuated, and to which are applied an aqueous sizing composition containing coupling agents and optional lubricants and pH adjusters by means of sizing applicators such as rolls 13a, 13b, and 13c. The groups of filaments are then collected into independent strands 15a, 15b, and 15c by means of gathering shoes 14a, 14b, and 14c, and the strands are introduced into cutting device 20.

Cutting device 20 includes a guide roller 21 having grooves of a number corresponding to the number of the strands, a freely rotatable feed roller 22 having a surface made of an elastic material having a large coefficient of friction with respect to glass fibers, e.g., rubber or synthetic resin, and a cutter roller 23 resiliently pressed against the feed roller 22 and driven positively by a motor, the cutter roller having a multiplicity of blades projecting radially therefrom. The wetted strands 15a, 15b, and 15c introduced into the cutting device 20 are wound around the feed roller 22 past the groove of the guide roller 21, and are cut at the point of contact between the feed roller 22 and the blades of the cutter roller 23 into pieces, i.e., chopped strands 24, of a length which is determined by the circumferential pitch of the blades.

The chopped strands 24 are dropped onto a suitable conveying means, such as conveyor 30, and are conveyed to the tumbling apparatus 40. The preferred conveyor for transporting the wet chopped strand segments is a belt conveyor having a dimpled, non-stick surface, such as that commercially available from Sparks under the trade designation Ultraline Food Belt Monoflex WU220M (white polyurethane with mini diamond top cover).

The tumbling apparatus 40 comprises a pelletizing drum 41 rigidly secured at one end to a hollow, zig-zag pellet densifying tube 42 rotationally mounted on a frame 43 via caster assemblies 44 and rotated by drive motor 45, e.g., a 30-amp variable-speed motor. The densifying tube 42 is attached to the drum 41 at a location radially distant from the rotational center of the drum and is in flow communication therewith. Preferably, the working volume of hydrated strand segments and pellets within the drum is from about 20% to about 50% of the drum volume, more preferably about 50 percent of the drum volume, to ensure a retention time within the drum adequate to form pellets but insufficient to degrade them through abrasion.

The densified pellets pass from the drum 41 through the densifying tube 42, and emerge from the densifying tube at its outlet 49. The density of the pellets emitted from the densifying tube is preferably from about 46 lb./ft$^3$ to about 62 lb./ft$^3$, which includes about 14% moisture content by weight.

Tumbling apparatus frame 43 is preferably provided with elevation-adjusting means 43a, to allow the tumbling apparatus to be maintained at a slight angle up to about 5 degrees from horizontal to ensure proper flow of material through the pelletizing drum and densifying tube. In a preferred embodiment of the invention, the angle is from about 1 degree to about 3 degrees.

The pellets emerging from the densifying tube fall onto conveyor 50 and are transported to oven 60, where the hydrating solution is dried. Preferably, conveyor 50 is a belt conveyor having a dimpled, non-stick surface commercially available from Sparks under the trade designation Ultraline Food Belt Monoflex WV220M (white polyurethane with mini diamond top cover).

Although the invention has been described in detail in reference to preferred features and embodiments, various modifications will become readily apparent to artisans through practice of the invention. Accordingly, the invention is intended not to be limited by the foregoing description, but to be defined by the appended claims and their equivalents.

What is claimed is:

1. A process for forming glass fiber pellets comprising:
    a. forming a strand comprising a plurality of substantially continuous glass fibers;
    b. chopping said strand into segments;
    c. applying to said segments an aqueous hydrating composition;
    d. pelletizing said segments by subjecting said segments to a first tumbling action to distribute the hydrating composition substantially uniformly over the segments and form said segments into pellets having a moisture content; and
    e. densifying said pellets by subjecting said pellets to a second tumbling action sufficient to compact the fibers in the pellets and increase pellet density to form densified pellets.

2. The process of claim 1, wherein the hydrating composition is applied to said segments in a quantity such that the moisture content is from 12 to 16 percent by weight.

3. The process of claim 2, wherein said moisture content is from 13 to 14 percent by weight.

4. The process of claim 2, wherein said first tumbling action is provided by tumbling said segments in a rotating drum.

5. The process of claim 4, wherein said first tumbling action is conducted for a pelletizing time of from about 1 minute to about 10 minutes.

6. The process of claim 5, wherein said pelletizing time is from 1 minute to 3 minutes.

7. The process of claim 4, wherein said second tumbling action is provided by tumbling said pellets in a rotating zig-zag tube.

8. The process of claim 7, wherein said second tumbling action is conducted for a densifying time no greater than about 5 minutes.

9. The process of claim 8, wherein said densifying time is from 1 minute to 2 minutes.

10. The process of claim 7, wherein the densified pellets have a bulk density that is from about 13 percent to about 60 percent greater than the bulk density of the segments, and the densified pellets have an average diameter that is from about 10 times to about 65 times greater than the average diameter of the segments.

11. The process of claim 4, wherein said applying comprises metering the aqueous hydrating composition and separately metering water to a nozzle in the rotating drum.

12. The process of claim 2, wherein said aqueous hydrating composition contains a film-forming binder.

13. The process of claim 12, wherein said binder comprises at least one resin selected from the group consisting of epoxies, polyurethanes, acrylics, and polyalkylene polymers.

14. The process of claim 12, further comprising applying a size composition to said plurality of substantially continuous glass fibers before said chopping, said size composition consisting essentially of from 0.1 weight percent to 1.0 weight percent of a coupling agent, from 0 weight percent to 0.1 weight percent of a lubricant, from 0 weight percent to 0.3 weight percent of a pH adjuster, and water.

15. The process of claim 14, wherein said coupling agent is 3-aminopropyltriethoxysilane and said lubricant is a condensation product of stearic acid and ethanolamine.

16. The process of claim 7, further comprising conveying said segments to said rotating drum on a conveyor belt having a dimpled surface.

17. The process of claim 8, further comprising drying said densified pellets.

18. The process of claim 17, wherein said drying is conducted in a fluidized-bed oven, and further comprising conveying said densified pellets to said oven.

19. The process of claim 1, wherein said first and second tumbling actions are performed in separate regions within a single apparatus.

20. The process of claim 1, wherein: said pelletizing comprises tumbling the segments in a drum rotationally driven about its longitudinal axis, said drum having a first and second end, said first end having an inlet opening receiving said segments and said second end having an outlet opening discharging said pellets, the center of said outlet opening being radially distant from the longitudinal axis of said drum; said applying comprises spraying the hydrating composition onto said segments using a spray head located adjacent to said inlet opening of said drum; and said densifying comprises tumbling the pellets in an undulating hollow tube rotationally driven about its longitudinal axis, said tube having a first and second open end, said first open end receiving said pellets and said second open end discharging said densified pellets.

* * * * *